United States Patent
Thoma

(10) Patent No.: US 8,826,903 B2
(45) Date of Patent: Sep. 9, 2014

(54) HEAT GENERATOR GROUP WITH JET PUMP FLOW CIRCUIT CONTROL

(75) Inventor: Hans Günther Thoma, Buchholz (DE)

(73) Assignee: Helmut Bälz GmbH, Heilbronn (DE)

( * ) Notice: Subject to any disclaimer, the term of this patent is extended or adjusted under 35 U.S.C. 154(b) by 217 days.

(21) Appl. No.: 12/932,017

(22) Filed: Feb. 16, 2011

(65) Prior Publication Data

US 2011/0203576 A1    Aug. 25, 2011

(30) Foreign Application Priority Data

Feb. 24, 2010   (DE) .......................... 10 2010 009 081

(51) Int. Cl.
*F24J 2/42*   (2006.01)

(52) U.S. Cl.
USPC ........... 126/609; 126/610; 126/611; 126/628; 165/45; 237/2 A; 237/7; 237/8 A; 237/16

(58) Field of Classification Search
CPC ........................................................ F24D 3/02
USPC ............. 126/631, 116 R, 609, 610, 611, 628; 237/7, 8 A, 8 B, 8 R, 2 A, 2 B, 13, 16, 17, 237/18, 19, 50, 56, 59, 60, 61, 62, 63, 70, 237/71; 417/76, 77, 79

See application file for complete search history.

(56) References Cited

U.S. PATENT DOCUMENTS

| 4,046,320 | A | * | 9/1977 | Johnson et al. ................ 237/8 C |
|---|---|---|---|---|
| 4,052,001 | A | * | 10/1977 | Vogt ................................ 126/585 |
| 4,132,356 | A | * | 1/1979 | Ramer ............................ 126/616 |
| 4,169,554 | A | * | 10/1979 | Camp .............................. 126/610 |
| 4,406,136 | A | * | 9/1983 | Picchiottino .................. 62/238.6 |
| 4,444,246 | A | * | 4/1984 | Reinsch .................... 165/104.22 |
| 4,462,542 | A | * | 7/1984 | Person ............................ 237/19 |
| 4,480,785 | A | * | 11/1984 | Balz ................................. 237/6 |
| 4,502,626 | A | * | 3/1985 | Gerstmann et al. .......... 122/44.2 |
| 4,846,617 | A | * | 7/1989 | Ehrhardt ........................ 417/187 |
| 4,979,374 | A | * | 12/1990 | Kabakov et al. .............. 62/238.2 |
| 2009/0014156 | A1 | * | 1/2009 | Vetrovec .................. 165/104.31 |
| 2009/0314464 | A1 | * | 12/2009 | Farrell ............................ 165/57 |
| 2011/0048404 | A1 | * | 3/2011 | Lee ................................ 126/587 |

(Continued)

FOREIGN PATENT DOCUMENTS

| DE | 19859364 A1 | * | 7/2000 |
|---|---|---|---|
| DE | 198 59 364 C2 | | 9/2001 |
| DE | 19859364 C2 | * | 9/2001 |

*Primary Examiner* — Avinash Savani
*Assistant Examiner* — John C Hailey, III
(74) *Attorney, Agent, or Firm* — R. S. Lombard; K. Bach

(57) ABSTRACT

In the heat utilization installation (1) according to the invention several heat sources (2) are included which are provided each with a jet pump (16), (17), (18), (19). The heat sources (2) are connected to a heat carrier circuit system (7) which includes a single, central circulating pump or circulating pump unit (20). The individual jet pumps (16) to (19) are so controlled for the respective heat sources (2), the required operating temperatures with respect to temperature difference between the outlet and inlet and the flow volume are maintained or achieved. With the possibility of independent control of the flow volumes at the various heat sources (2), uniform fluid temperatures as required for a buffer store (22) or heat consumers can be maintained.

14 Claims, 1 Drawing Sheet

(56) References Cited

U.S. PATENT DOCUMENTS

| | | | |
|---|---|---|---|
| 2011/0083462 A1* | 4/2011 | Engelhart et al. | 62/324.1 |
| 2012/0125320 A1* | 5/2012 | Engelhart | 126/622 |
| 2013/0153177 A1* | 6/2013 | Kuske et al. | 165/104.31 |
| 2014/0034742 A1* | 2/2014 | Meinen et al. | 237/8 A |

* cited by examiner

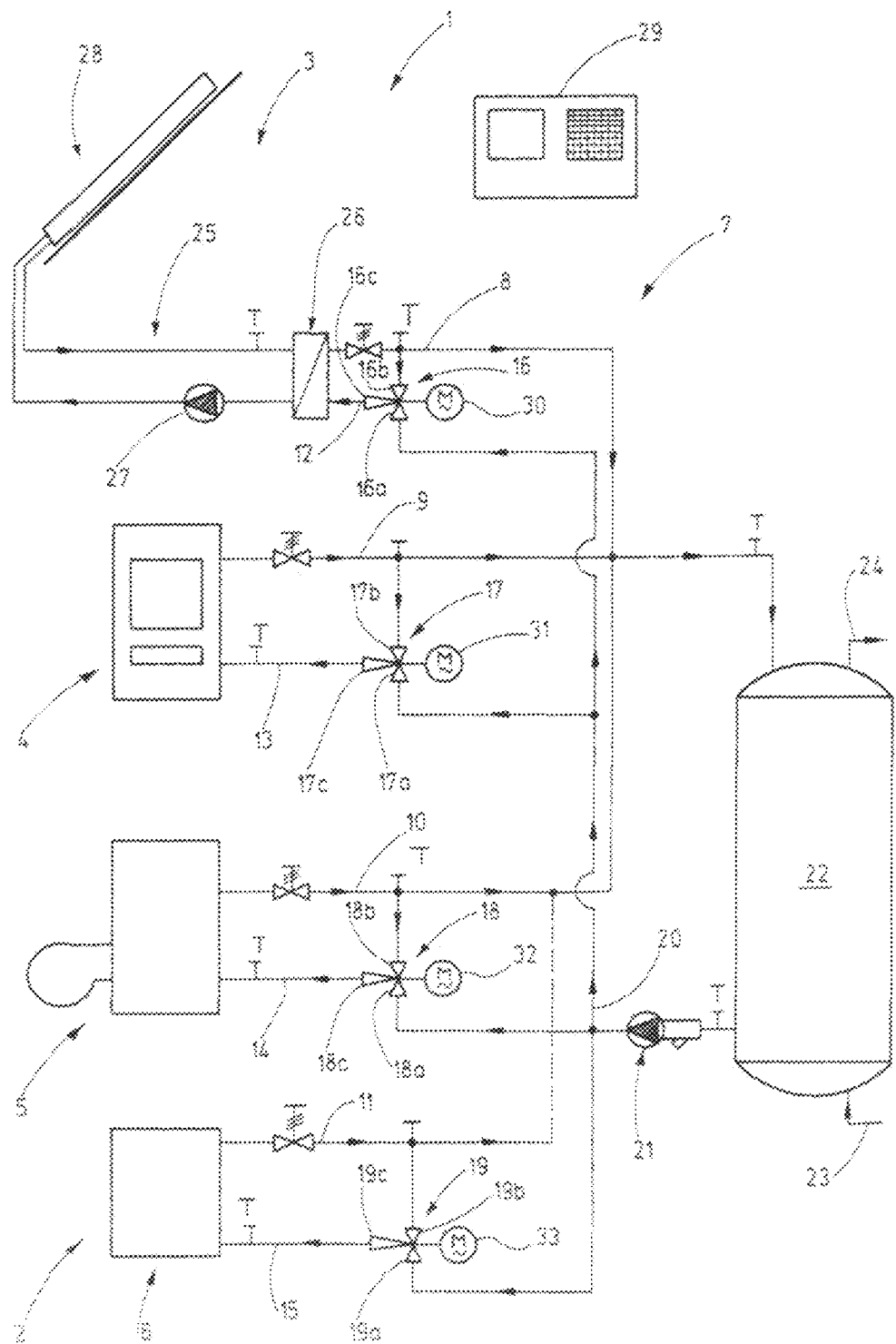

HEAT GENERATOR GROUP WITH JET PUMP FLOW CIRCUIT CONTROL

CROSS-REFERENCE TO RELATED APPLICATION

This application claims the priority of German Application No. 10 2010 009 081.6-34 filed Feb. 24, 2010.

BACKGROUND OF THE INVENTION

The invention resides in a heat utilization installation with at least two heat sources of the same or of a different type.

Heat supply installations are known wherein several heat consumers are supplied with heat from a single heat source. DE 198 59 364 C2, for example, discloses a remote heat utilization system in which the heat supply to the individual heat consumers is apportioned by jet pumps. They utilize the pressure difference present in the remote heat supply system between the supply line and the return line for the circulation of the heat carrier fluid through the consumer circuits so that no electrical circulation pump is needed for circulating the heat carrying fluid.

Increasingly, however, it becomes expedient to integrate several heat sources into the heat utilization installations. This may become at least then problematic when the individual heat sources have very different properties. For example, flow volume requirements, supply flow and return flow temperatures or similar parameters may be basically different.

It is the object of the present invention to provide a concept by means of which several heat sources can combine in a single heat interaction installation.

SUMMARY OF THE INVENTION

In the heat utilization installation (1) according to the invention several heat sources (2) are included which are provided each with a jet pump (16), (17), (18), (19). The heat sources (2) are connected to a heat carrier circuit system (7) which includes a single, central circulating pump or circulating pump unit (20). The individual jet pumps (16) to (19) are so controlled for the respective heat sources (2), the required operating temperatures with respect to temperature difference between the outlet and inlet and the flow volume are maintained or achieved. With the possibility of independent control of the flow volumes at the various heat sources (2), uniform fluid temperatures as required for a buffer store (22) or heat consumers can be maintained.

The heat utilization installation according to the invention includes several heat sources which are connected to a common heat supply circuit system. At least one of the heat sources is provided at its input with a jet pump. Preferably, several or all of the heat sources are provided with jet pumps at their input side. Preferably, the respective jet pump is arranged in the return line via which the heat carrier fluid is conducted to the heat source. Preferably, the jet pump sucks carrier fluid from the respective outlet line to the heat source and mixes it to the inlet line. In this way, the temperature level of the heat source and the inlet flow is increased and, at the same time, the flow volume through the heat source is increased.

With the arrangement of a jet pump in the inlet line of the heat source, the flow volume through the heat source and the inlet temperature can be expediently controlled. It is in particular possible to adjust these values independently of the heat requirements of the heat consumer and independently of the volume flows and temperatures of other heat sources. In this way, each heat source can be operated at its optimum operating point. The concept according to the invention consequently permits in particular the combination of heat sources with different operating characteristics in the same heat utilization installation.

With the provision of jet pumps in the inlets of the individual heat sources the heat supply circuit requires only a single central circulating pump unit. This may be, for example, a single electrical pump or two or several pumps arranged in parallel. This central electrical circulating pump unit is sufficient for maintaining the whole heat carrier fluid circuit. The individual heat sources do not need circulating pumps if they are not provided with their own internal circuit. Also, the heat consumers need no circulating pumps. They too can be controlled by way of jet pumps as it is known from the state-of-the-art.

The individual heat sources may be boilers, ovens, solar collectors, geothermal plants, combustion engines, fuel cells, heat pumps or similar. As heat sources also waste concentrators may be used as heat sources also sources may be used which are capable of supplying heat only occasionally and possibly not at convenient times. A buffer store included in this system can store the heat. Preferably, as jet pumps controllable jet pumps are provided. They include a control member by which the pump volume of the jet pump can ideally be adjusted to zero and, generally, can be controlled in a stepless fashion. A machine heat source can be cut out of the circuit system by closing the jet pump.

If the heat source is, for example, an oven operated by a solid or a liquid fuel, or a boiler, the control arrangement may first set the jet pump of the respective heat source to a predetermined minimum setting in order to maintain in a start-up state a minimum circulation flow volume as required by the manufacturer. When the respective oven or boiler has then reached its operating temperature the jet pump controls the volume flow in a temperature-dependent manner for optimal energy generation. It can adjust the volume flow and the respective inlet and outlet temperatures in such a way that a maximum energy efficiency is obtained in the respective oven or boiler.

Furthermore, with an appropriate setting of the various jet pumps a volume flow distribution between the individual heat sources can be achieved which results in a cost-optimized overall operation. For example, the extraction of solar energy may be given preference over the generation of energy by combustion of fuel. If, for example, the solar installation supplies a large part of the required heat, but a small amount of additional heat is required, the generation of additional heat by fuel is reduced to a minimum and this is also chosen if as a result the furnace or boiler will then operate at or somewhat lower efficiency. Generally, however, by an appropriate jet pump control the temperature spread between inlet and outlet of the respective furnace or boiler can still be adjusted to an optimum value. In this way, the operation of the individual heat sources with the jet pump and the admixing of heat carrier flow volume to the return line, the flow through the furnace or boiler and the inlet temperature can be independently adjusted at least within limits. In this way, both objects, that is the optimization of the efficiency at the individual heat sources and an optimum utilization of heat generated without cost (for example solar energy), can be achieved.

BRIEF DESCRIPTION OF THE DRAWINGS

Further features and advantageous embodiments of the invention are apparent from the drawings exemplary of the invention in which:

The sole FIGURE is a schematic basic representation of a heat utilization plant.

DETAILED DESCRIPTION OF VARIOUS EMBODIMENTS

The FIGURE shows a heat utilization installation or plant 1 provided for example for heating a building. The heat utilization installation 1 is shown only in part, particularly with respect to the components for the generation of the heat. Heat consumers such as for example radiators, floor heating systems, hot water storage devices or similar are not shown.

The heat utilization installation 1 utilizes several, preferably different but, if expedient, also same type heat sources 2, including for example a thermal solar heat collector system 3, a furnace 4 for solid fuels, a boiler suitable for fluid fuels such as for example a gas furnace or an oil furnace or another heat source 6. The other heat source may be for example a geothermal plant, an arrangement for utilizing the waste heat of a fuel cell, a heat generating engine operating in connection with the heat utilization system or a heat storage device.

For networking all the heat sources 2 a heat transport circuit system 7 is provided to which all the heat sources 2 and also the consumers which are not shown are connected. The heat transport circuit system 7 comprises in each case an outlet 8-11 leading away from the respective heat source 2 and an inlet 12-15 leading toward the respective heat sources. At least one of the heat sources 2, preferably at several, and preferably, at all the heat sources 2 in each case a jet pump 16-19 is connected. Each jet pump has a drive connection a (16a-19a), a suction connection b (16b-19b) and a diffuser connection c (16c-19c). For differentiation the respective connections a, b, c are additionally provided with the reference number of the jet pump (16a, 16b, 16c, 17a, 17b, 17c, etc.)

The diffuser connections 16c to 19c are connected to the respective inlet lines 12 to 15, the suction connections 16b to 19b are connected to the respective outlet lines 8 to 11. The drive connections 16a to 19a are connected via a corresponding inlet collection line 20 to the pressure side of a circulating pump unit 21 which comprises preferably one or several electrical pumps. The circulating pump unit 21 is directly connected to the return line 23 of all the heat consumers or the return line of a buffer store 22 to which the return line of the heat consumer extends. The outlets 8 to 11 extend to the buffer store 22 or, alternatively the inlet line 24 of the heat consumers.

As apparent, the heat transport circuit system 7 is formed by an interconnected pipe system through a uniform heat carrier fluid circulates. The heat carrier fluid, for example water, flows through the heat consumers and possibly also through the heat sources 2. It is however possible to except one or several of the heat sources. The solar heat collector 3 may for example have its own heat carrier circuit 25 which is connected to the main heat carrier circuit 7 via a heat exchanger, preferably a plate-type heat exchanger 26. The plate-type heat exchange 26 separates the heat carrier circuit 25 which includes as heat carrier fluid, for example, glycol or a glycol-water mixture. A circulating pump 27 pumps the respective heat carrier in the circuit 25 to a solar collector 28 and from there back to the plate heat exchanger 26.

The heat utilization installation 1 described so far includes a control unit 29 which is adapted to control the jet pumps 16 to 19 by way of corresponding control motors 30, 31, 32, 33. The jet pump 16-19 may for example have a valve spindle via which the drive nozzle flow cross-section can be adjusted. Alternative or additional control means may be provided. For example, a throttle valve may be provided in or at the suction connection b of a respective throttle valve. Further, the system maybe provided at several locations with temperature sensors which are indicated in the FIGURE by the capital letter T. The temperatures measured by the temperature sensor T are supplied to the control unit 29 via information lines which however are not shown in the drawings. For example, all the inlet and outlet lines may be provided with corresponding temperature sensors.

The heat utilization installation 1 operates as follows:

It is assumed that at least one of the heat sources 2, for example, the solar heat collector 3 supplies heat. Then the control unit 29 adjusts the jet pump 16 such that at the heat exchanger 26 an outlet temperature is obtained which is optimal for the heat utilization and, if the inlet temperature is measured also the optimal inlet temperature is established. The circulating pump 27 can of course additionally be controlled. With the admixing of outlet water from the outlet line 8 to the inlet (line 12) the inlet temperature can be adjusted to a relatively high value so that also at a relatively low solar radiation input high temperatures for feeding the buffer store 22 or the connected consumers can be achieved.

If no heat is contributed by the solar collector 28 or when additional heat is needed one or several other heat sources 2 may be activated. For example, the boiler 5 is fixed. Then the jet pump 18 is opened to such an extent that at the inlet 14 and the outlet 10 a desired relatively small flow is obtained. In this way, the boiler 5 reaches its operating temperature relatively fast. Then the fluid flow through the boiler can be increased by a corresponding control of the jet pump 18.

In accordance therewith also all other heat sources are used as needed.

In this heat utilization installation presented herein, at each heat source 2 a circuit is established via the outlet line, the by-pass line which extends to the suction inlet b of the respective jet pump and the respective inlet line. As a result, the volume flow in the respective heat source 2 is higher than in the outlet line. As a result, if desired, the temperature difference between the outlet and the inlet can be reduced and the heat utilization in the respective source can be improved. In addition, only one circulating pump unit 21 is needed for the operation of the whole system.

In a heat utilization 1 comprising several heat sources 2, a central circulating pump unit 21 is provided for maintaining a flow through out the whole heat transport circuit system 7. The individual jet pumps 16 to 19 are so controlled that for the respective heat sources 2, the required operating temperatures with respect to temperature difference between outlet and inlet and the flow volume are maintained or achieved. With the possibility of independent control of the flow volumes at the various heat sources 2, uniform fluid temperatures as required for the buffer store 22 or the heat consumers can be obtained.

LIST OF REFERENCE SIGNS

1 heat utilization installation
2 heat sources
3 solar heat collector
4 furnace
5 boiler
6 heat source
7 heat transport circuit system
8-11 outlets
12-15 inlets
16-19 jet pumps
20 inlet collection line 21 circulating pump unit
22 buffer store
23 return line
24 inlet line
25 heat carrier circuit (solar)
26 heat exchange
27 circulating pump
28 solar collector
29 control unit
30-33 control motors

What is claimed is:

1. A heat utilization installation, particularly for buildings, especially apartment buildings, comprising:

several heat sources (2), each of said heat sources (2) having an inlet (12, 13, 14, 15) and an outlet (8, 9, 10, 11), each of said heat sources (2) provided with a jet pump (16, 17, 18, 19) including a drive nozzle;

a heat transport circuit system (7) for transporting heat from the heat sources (2) to at least one heat consumer;

a single central circulating pump unit (21) for maintaining a heat carrier circuit flow in the heat transport circuit system (7) the central circulating pump unit (21) having a positive pressure side each of the jet pumps (16, 17, 18, 19) arranged in heat carrier circuit flow ahead of and in heat increasing relationship with a respective one of the heat sources (2) via said inlet (12, 13, 14, 15) thereof, each of the jet pumps (16 17 18 19) having a diffuser (c) a suction connection (b) and a drive nozzle connection (a); the respective inlet (12; 13, 14, 15) of each of said heat sources (2) disposed in series and in heat carrier circuit flow and in direct connection with the diffuser (c) of one of said jet pumps (16, 17, 18, 19); the respective outlet (8, 9, 10, 11) of each of said heat sources (2) directly connected to and in heat carrier circuit flow with the suction connection (b) of one of said jet pumps (16 17 18 19) the drive nozzle connection (a) of each of the jet pumps (16 17 18 19) connected in heat carrier circuit flow with the positive pressure side of the central circulating pump (21); and wherein each jet pump (16, 17, 18, 19) further comprises a control member as required and for controlling the flow volume through the respective heat source (2) and the inlet temperature of each of the jet pumps (16, 17 18 19), wherein the control member is controllable, by a control unit, whereby each respective heat source (2) is operated at a predetermined optimum operating point upon activation of the respective jet pump (16, 17, 18, 19).

2. The heat utilization installation according to claim 1, wherein the heat sources (2) are heat sources (3, 4, 5, 6) of different types.

3. The heat utilization installation according to claim 1, wherein the heat sources (2) are heat sources (3, 4, 5, 6) which supply heat independently from one another.

4. The heat utilization installation according to claim 1, wherein at least one of the heat sources (2) is a solar heat collector (3).

5. The heat utilization installation according to claim 1, wherein at least one of the heat sources (2) is a furnace (4) or a boiler (5) for the combustion of solid, liquid or gaseous fuels.

6. The heat utilization installation according to claim 1, wherein at least one of the heat sources (2) is a heat pump or a geothermal plant (6).

7. The heat utilization installation according to claim 1, wherein the drive nozzle connection (a) of each jet pump (16, 17, 18, 19) is connected to a central inlet collection line (20).

8. The heat utilization installation according to claim 1, wherein a buffer store (22) is provided in the heat transport circuit system (7).

9. The heat utilization installation according to claim 1, wherein at least one of the heat sources (2) includes a heat carrier circuit (25) which is connected to the heat transport circuit system (7) by way of a heat exchanger (26).

10. The heat utilization installation according to claim 9, wherein the heat carrier circuit system (25) includes a separate circulating pump (27).

11. The heat utilization installation according to claim 1, where the control member comprises a control motor (30, 31, 32, 33).

12. The heat utilization installation according to claim 1, where the control member comprises a valve spindle for varying the flow cross-section of the respective drive nozzle.

13. The heat utilization installation according to claim 1, where the control member comprises a throttle valve in or at the respective suction connection (b).

14. The heat utilization installation according to claim 1, where the control member comprises a temperature sensor (T).

* * * * *